Figures 3, 4:
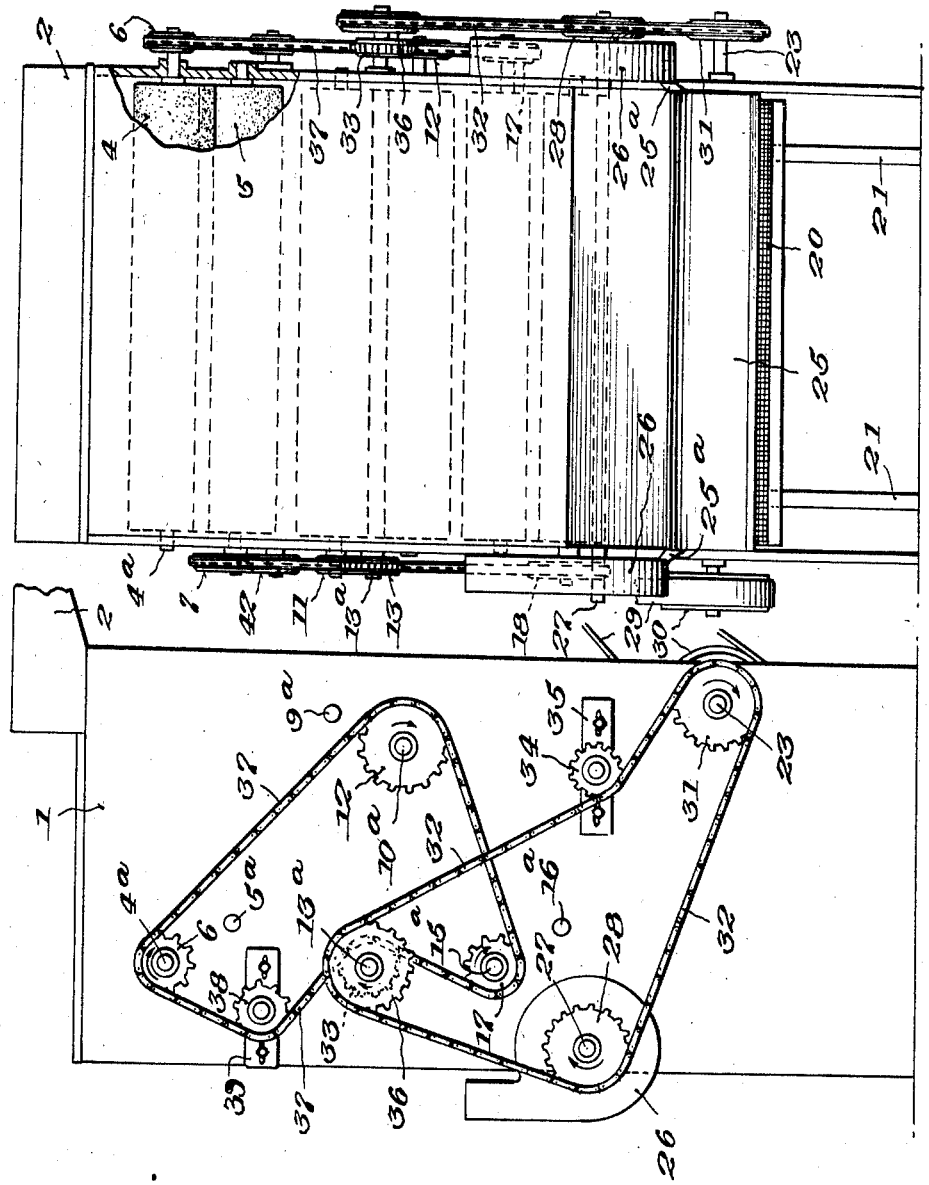

Dec. 5, 1933.  J. H. STANSBURY  1,937,851
METHOD OF TREATING PEAS AND BEANS
Filed April 10, 1931   2 Sheets-Sheet 1
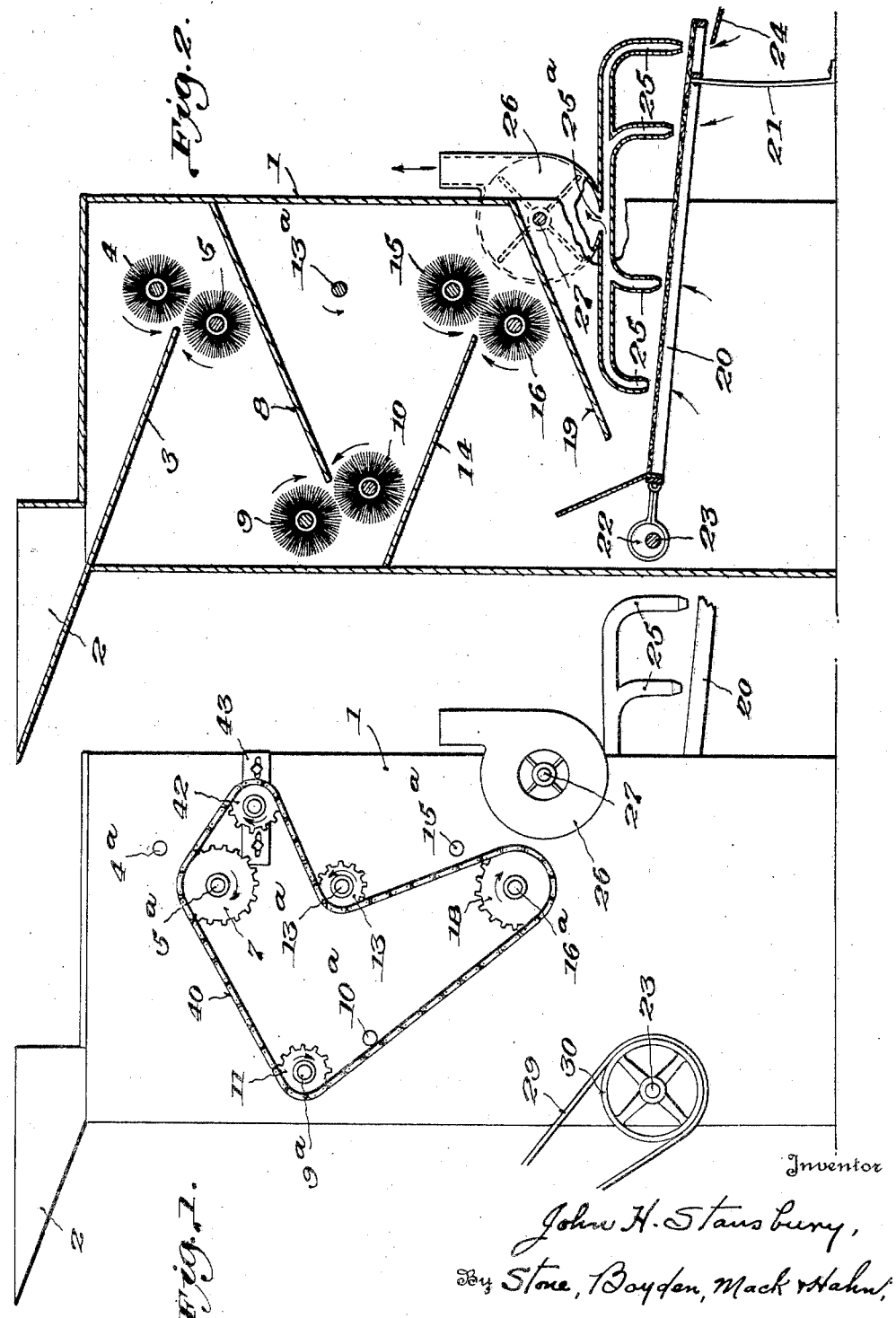
Inventor
John H. Stansbury,
By Stone, Boyden, Mack & Hahn,
Attorneys.

Dec. 5, 1933.   J. H. STANSBURY   1,937,851
METHOD OF TREATING PEAS AND BEANS
Filed April 10, 1931   2 Sheets-Sheet 2

Inventor
John H. Stansbury,
By Stone, Boyden, Mack & Hahn,
Attorneys

Patented Dec. 5, 1933

1,937,851

UNITED STATES PATENT OFFICE 1,937,851

METHOD OF TREATING PEAS AND BEANS

John Herbart Stansbury, Fruitland, Md., assignor of one-half to Ralph O. Dulany, Fruitland, Md.

Application April 10, 1931. Serial No. 529,243

3 Claims. (Cl. 146—219)

This invention relates to the art of treating vegetables and more particularly to a method of treating fresh peas and beans preparatory to canning.

In the usual method of canning peas and beans in the fresh or green state, they are first shelled, washed and graded and then placed in the cans with a suitable liquid, sealed and processed.

As is well known, when cans thus prepared are opened, the liquid in the can is frequently of a cloudy or milky color, and this detracts from the appearance and attractiveness of the article. Heretofore, no means for preventing this cloudy or milky appearance of the liquid has been devised.

I have now discovered that this discoloration of the liquid is due to the presence of organic matter commonly known as "bloom" with which the skin of fresh peas and beans is coated, such "bloom" sometimes containing organisms such as enzymes, and that it can be prevented by removing this film from the skin.

Accordingly, I have devised a method and apparatus for cleaning or polishing the peas or beans before they are placed in the can, so that they present a smooth, bright appearance.

In order that the invention may be readily understood, reference is had to the accompanying drawings, forming part of this specification, and in which:

Figure 1 is a side elevation of the apparatus;
Figure 2 is a vertical central section thereof;
Figure 3 is a side elevation looking from the side opposite to that shown in Figure 1; and
Figure 4 is an end elevation of the apparatus, parts being shown in section.

The machine or apparatus comprises a housing or casing 1, having at the top a hopper 2, into which the peas or beans are fed. From the hopper 2 extends a chute 3, to the first cleaning or brushing device.

I have found that an effective means for producing the rubbing or polishing action desired comprises a pair of rotary brushes having relatively soft bristles, the peripheries of these brushes being arranged to run in contact but in opposite directions and preferably at different speeds.

As shown in the drawings, three of these pairs of rotary brushes are employed, these pairs being designated by the numerals 4 and 5, 9 and 10, and 15 and 16. The chute 3 delivers the peas or beans at a point between the first pair of brushes. From these, they fall upon a chute 8 which delivers them into the second pair of brushes, and from these they fall upon a chute 14 which delivers them to the third pair of brushes.

The brushes 4 and 5 are mounted upon shafts $4^a$ and $5^a$, respectively, journalled in the upper part of the housing, the shaft $4^a$ carrying a driving sprocket 6 and the shaft $5^a$ carrying a driving sprocket 7, preferably disposed, as shown, at opposite sides of the machine.

The brush 9 is mounted upon a shaft $9^a$ and the brush 10 is mounted upon the shaft $10^a$, these shafts having secured thereto driving sprockets 11 and 12, respectively, mounted at opposite sides of the machine.

Brush 15 is mounted upon shaft $15^a$ and brush 16 is mounted upon shaft $16^a$, these two shafts carrying at their ends driving pulleys 17 and 18, respectively, preferably disposed at opposite sides of the machine.

From the last pair of brushes 15, 16, the peas or beans fall upon an inclined chute 19, from the lower end of which they are delivered upon a shaking screen 20, carried on flexible supports 21, and operated by means of an eccentric 22, secured to a shaft 23, journalled in the lower part of the housing of the machine. As the peas or beans pass off of the lower edge of the screen 20, they fall upon any suitable conveyor or receptacle such as indicated at 24 in Figure 2.

Arranged above the shaking screen 20 are a plurality of suction nozzles 25 having their mouths disposed in close proximity to the surface of the screen and extending the full width thereof. These nozzles are connected with a manifold which communicates at each side through a connection $25^a$ with the casing of a centrifugal fan 26, these fans 26 being mounted upon a common shaft 27, carrying at its end a sprocket wheel 28. From the above, it will be seen that the result of this arrangement of suction nozzles and fans is to create strong currents of air passing transversely through the screen 20 from below upwardly, these air currents enveloping the beans or peas which are traveling over the surface of the screen 20 in a thin stream or layer. This not only serves to evaporate the moisture on the outside of the peas or beans, but also tends to clean off and remove any loose particles of foreign matter which may be adhering to them or which may be moving along with them on the screen.

To one end of the shaft 23 is secured a driving pulley 30 around which a driving belt 29 passes. On the other end of the shaft 23 is mounted a main driving sprocket 31, and around this sprocket runs a chain 32. This chain also engages the sprocket wheel 28 which drives the fans, and a sprocket wheel 36 on a counter shaft 13a, which serves to transfer the drive from one side of the machine to the other. On this shaft 13a, adjacent the sprocket wheel 36, is a second sprocket wheel 33, and around this passes a chain 37, which engages and drives the sprocket wheel 6 of the brush 4, the sprocket wheel 12 of the brush 10 and the sprocket wheel 17 of the brush 15.

In order to maintain the chains 32 and 37 at proper tension, idler sprockets 34 and 38 are provided, and are mounted upon adjustable brackets 35 and 39, respectively.

In the other side of the machine, the shaft 13a carries a sprocket 13, and around this passes a chain 40, which engages the sprocket 7 of the brush 5, the sprocket 11 of the brush 9 and the sprocket 18 of the brush 17. An idler sprocket 42 mounted on an adjustable bracket 43 is also preferably engaged with this chain to regulate the tension thereof.

It will be noted that the sprockets 6, 11 and 17 are much smaller than the sprockets 7, 12 and 18, and thus the brushes 4, 9 and 15 are driven at considerably higher speeds than the brushes 5, 10 and 16. The arrows on Figure 2 indicate the direction of rotation.

From the foregoing, it will be seen that the brushes of each pair rotate in opposite directions, as if they were geared together, but at different speeds, so that the adjacent bristles continuously wipe past each other, and the peas or beans passing between these brushes are subjected to a vigorous rubbing, brushing and polishing action. It has been found in practice that good results can be obtained by employing a speed ratio of one to two between the two brushes of each pair.

In treating beans and peas according to my improved method, they are first shelled and washed as usual, and are then fed while wet into the hopper 2. From this, they pass successively down through the three pairs of rotary brushes by which they are thoroughly scrubbed and polished and then travel over the shaking screen 20, where they are subjected to the strong air currents flowing upwardly into the nozzles 25, which air currents, as above mentioned, tend to further clean and dry them.

The peas or beans coming from the screen 20 are then placed in the cans and processed in the usual manner, and when such cans are opened, it is found that the peas or beans have an exceptionally bright, attractive appearance and that the liquid in which they are packed is almost perfectly clear.

What I claim is:

1. The method of treating fresh, green peas and beans preparatory to canning which comprises first shelling and washing them, and then subjecting them after leaving the water and while still wet to a brushing operation.

2. The method of treating fresh, green peas and beans preparatory to canning which comprises first shelling and washing them, then subjecting them while wet to a brushing operation, and finally removing the remaining superficial moisture.

3. The method of treating fresh, green peas and beans preparatory to canning which comprises first shelling and washing them, and then subjecting them to a brushing operation in air to produce a polished appearance.

JOHN HERBART STANSBURY.